(12) United States Patent
Maiocchi et al.

(10) Patent No.: US 7,050,257 B2
(45) Date of Patent: May 23, 2006

(54) METHOD FOR ESTIMATING THE RESISTANCE OF A DC MOTOR FOR POSITIONING READ/WRITE HEADS OF A HARD DISK

(75) Inventors: Giuseppe Maiocchi, Capiago Intimiano (IT); Roberto Oboe, Vicenza (IT); Federico Marcassa, Mogliano Veneto (IT); Michele Boscolo, Chioggia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 44 days.

(21) Appl. No.: 10/918,659

(22) Filed: Aug. 12, 2004

(65) Prior Publication Data

US 2006/0034009 A1    Feb. 16, 2006

(51) Int. Cl.
*G11B 19/02* (2006.01)
*G11B 5/596* (2006.01)
(52) U.S. Cl. .................. 360/71; 360/77.02; 360/78.04; 318/560; 318/254

(58) Field of Classification Search ............... None
See application file for complete search history.

(56) References Cited

U.S. PATENT DOCUMENTS

| 6,873,489 B1 * | 3/2005 | Ho et al. ............... 360/78.05 |
| 2005/0013037 A1 * | 1/2005 | Tanner ............... 360/78.04 |
| 2005/0237052 A1 * | 10/2005 | Chan ............... 324/207.11 |

* cited by examiner

*Primary Examiner*—Andrew L. Sniezek
(74) *Attorney, Agent, or Firm*—Lisa K. Jorgenson; Allen, Dyer, Doppelt, Milbrath & Gilchrist, P.A.

(57) ABSTRACT

A method for estimating resistance of a DC motor for positioning read/write heads of a data storage disk is provided. The DC motor is controlled in an open-loop voltage mode through a motor controller input with a first signal for compensating positioning of the read/write heads onto the data storage disk. The first signal is generated based upon a position error signal representing a difference between a position of the read/write heads and a center of a track to be read. The method includes monitoring the first signal during a read operation of data being stored on the data storage disk, and estimating the resistance based upon spectral components of the first signal.

29 Claims, 7 Drawing Sheets

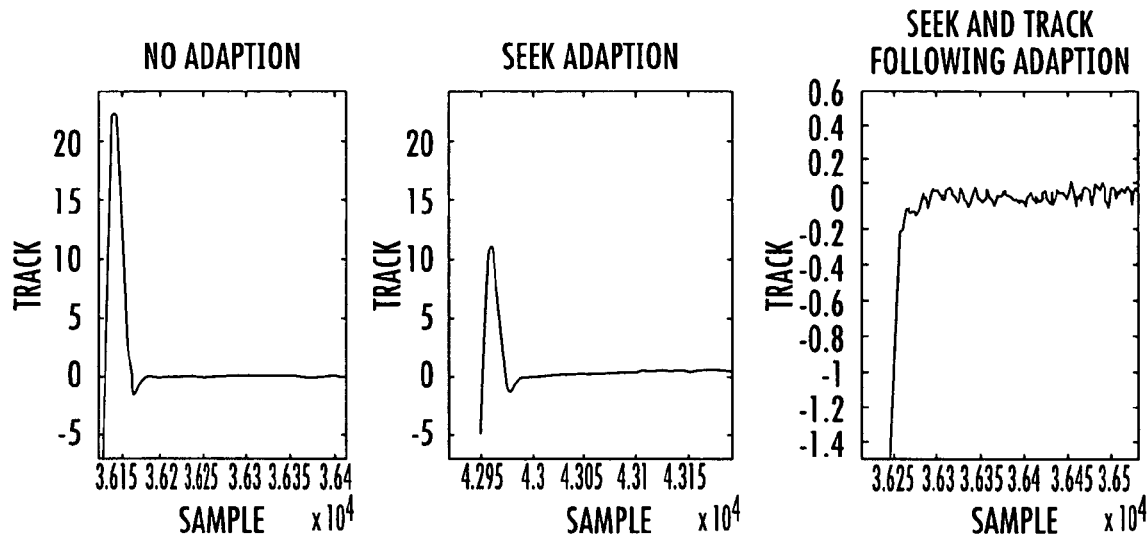

METHOD FOR ESTIMATING THE RESISTANCE OF A DC MOTOR FOR POSITIONING READ/WRITE HEADS OF A HARD DISK

FIELD OF THE INVENTION

The present invention relates in general to DC motors, and more particularly, to a method for determining an effective resistance of a DC motor, such as a Voice Coil Motor (VCM), for positioning read/write heads of a hard disk, and to a relative voltage mode driving circuit.

BACKGROUND OF THE INVENTION

The read/write heads of a hard disk are positioned by DC motors, typically a voice coil motor (VCM), that should be precisely driven for correctly sensing the arm or equivalent holder of the transducers to read data stored along a disk track. Voice coil motors are largely used, and for this reason the ensuing description is referred to these motors, but what will be stated holds even for other kinds of DC motors for positioning read/write heads onto a data storage disk.

Commonly, voice coil motors are current controlled by a feedback loop such as that of FIG. 1, often called a Current Minor Loop (CML). The attribute "Minor" means that the CML is an inner feedback loop for controlling the current absorbed by the motor. Conventionally, the main or outer feedback loop is the loop for actually controlling the position of the heads over the hard disk.

A sample main feedback loop is shown in FIG. 3. The position θ of the rotor of the motor VCM is compared with a desired position REFERENCE_POSITION, and a position error signal PES is generated. A controller of the position of the read/write heads HEADS POSITION CONTROLLER is input with the signal PES, and generates a signal U input to the voltage mode controller FILTER. Preferably, parameters of the voltage mode controller FILTER are updated as a function of estimated values of parameters of the motor VCM.

In the Current Minor Loop, the current absorbed by the motor is commonly monitored by a sensing resistor in series to at least one winding of the motor. The main drawback of this approach is that the value of the sensing resistors should be precisely determined for minimizing errors, and thus they are quite expensive. The voltage drop on the nodes of a sensing resistor should be provided to an integrated control circuit through dedicated pins. Because of the ever increasing integration level of electronic circuits, a larger number of pins implies larger packaging costs. Moreover, forming feedback loops for controlling in a current mode a motor is a non-negligible cost, especially for large scale productions.

To prevent using dedicated pins for a current sensing signal, a feedback loop and a corresponding controller and an open-loop voltage mode control, such as that depicted in FIG. 2, may be used. The external command U is provided to the controller which generates a respective control voltage of the power amplifier. The parameters of the controller are determined as a function of the parameters of the DC motor.

The admittance of the motor varies during the functioning because the motor heats, and thus its resistance R increases with temperature. As a consequence, the filter that generates the control voltage of the power amplifier may be not sufficiently accurate when the motor resistance differs from its nominal value.

Of course, it is possible to modify parameters that define the filter for adjusting them to resistance variations of the motor, but this can be done only after having determined the effective resistance R of the motor. This should be performed without sensing the current circulating in the motor for having the above mentioned advantages of the open-loop voltage mode control.

This need is particularly felt when driving voice-coil motors for positioning read/write heads of a hard disk. During the so-called "seek" operations, a temperature of the VCM increases and its resistance also increases. If a track has to be read immediately after a seek operation, the command signal provided to the motor may be unsuitable for positioning the read/write head on the desired track because the motor resistance has increased. The same problem is present when the motor cools down, and thus its resistance decreases.

To estimate the VCM resistance, several techniques can be used. Reference is directed to the following two references: Oboe et al., Realization Of A Hard Disk Drive Head Servo-Positioning System With A Voltage-Driven Voice-Coil Motor, Microsystem Technologies, Vol. 9, No. 4, 2003, pp. 271–281; and Oboe et al., Realization Of An Adaptive Voltage Driver For Voice Coil Motor, ISPS-MIPE Joint Conference, June 2003, Yokohama, Japan. In these refereces, an approach based on an EKF (Extended Kalman Filter) has been presented and applied to the on-line adaptation of the digital pre-filter in a voltage control mode.

This approach was quite effective and capable of tracking even stepwise variations of the VCM resistance. Convergence of the algorithm was ensured during seek operations, while the precision of the identification decreased when the seek span was reduced under a few tens of tracks. This was caused by the reduction of the signal-to-noise ratio that occurs when the head makes small movements. Indeed, in such conditions the command level becomes negligible as compared to the level of the noise due to RRO (Repetitive Run Out) and NRRO (Non-Repetitive Run Out) disturbances. The EKF noise model is no longer valid.

Another drawback of the EKF-based adaptation in actual HDDs is the high computational cost involved by this adaptation. Even if particular care has been devoted to the model order reduction and to the fixed-point optimized implementation, the EKF-based adaptation still required a fully dedicated DSP to the real-time computation, thus making the use of the voltage driver undesirable from an overall cost point of view.

SUMMARY OF THE INVENTION

In view of the foregoing background, an object of the invention is to estimate the resistance of a DC motor with a procedure that is not affected by the above mentioned drawbacks.

First, a resistance estimation algorithm for performing a reliable estimation even in low signal-to-noise ratio conditions is provided. Second, an estimation procedure requiring the least computational power to be performed is provided so as not to affect the overall cost of the VCM driver. These two aspects are not addressed by a single approach. Two different algorithms for estimating the resistance of the motor have been developed. The first is to be used during seek operations, and the second is to be used during track-following operations.

According to another aspect of the invention, a method for performing a transition from an estimation procedure during a seek operation and during a track following operation or vice-versa is provided.

The use of seek-based or track following-based identification is dictated by the state of the disk. Of course, there are internal flags of the HDD which signal that the disk is in a seek, a settling or a track following mode. These flags may be used for switching from an identification procedure during a track following to an identification procedure during a seek.

As an alternative, particularly useful when such information in the experimental system cannot be accessed, it is possible to activate a seek identification procedure when the absolute values of the signal PES and velocity go over some thresholds, and using the track following identification procedure when the signal PES and velocity are smaller than the same thresholds.

BRIEF DESCRIPTION OF THE DRAWINGS

For a better understanding of the invention, reference is made to the following description of exemplary embodiments thereof, considered in conjunction with the accompanying drawings, wherein:

FIGS. 14A, 14B and 14C are graphs showing trajectories of the heads at the arrival on the track 0 when a) no parameters estimation is performed, b) the estimation during a seek operation is performed, and c) both methods for estimating the resistance of the VCM during a seek and a track following operation are performed according to the invention; and FIG. 15 illustrates a threshold setting to switch between identification algorithms of the resistance of a VCM during a seek and a track following and vice-versa according to the invention.

DETAILED DESCRIPTION OF THE PREFERRED EMBODIMENTS

The gain of the overall system for positioning the read/write heads varies with temperature and position of the heads. Temperature directly affects the value of the VCM resistance, while VCM torque gain $K_t$ may decrease when the head is flying either on the outermost or on the innermost tracks. This is due to the edges of the permanent magnets being reached. The variation of the torque constant $K_t$ with the head position can be determined with ad hoc experiments and stored in a look-up table, to be used in run time, so only the variation of the VCM resistance should be performed on-line. Moreover, it will be shown below how a mismatch between the real value of $K_t$ and the nominal value does not influence the precision of the proposed estimation procedure.

Figure 4:
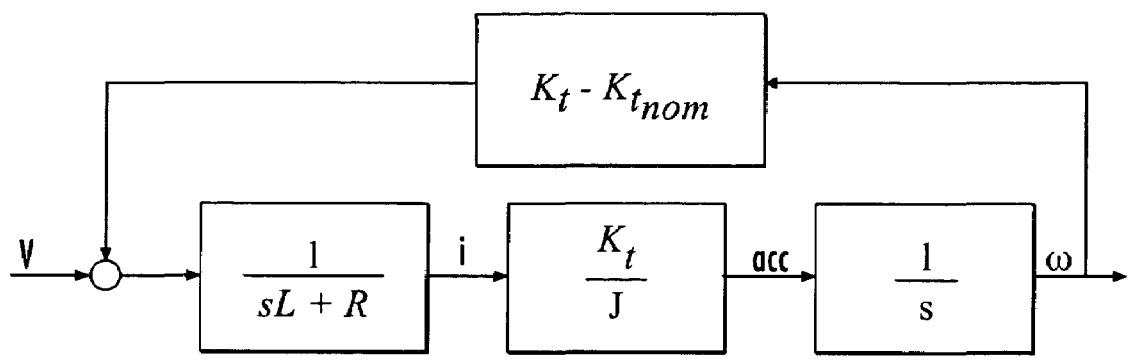
FIG. 4 is a block diagram of a model of a VCM controlled in a voltage mode when the real torque constant differs from its nominal value according to the invention.

Parameters estimation during seek operations will now be discussed. FIG. 4 is a simplified model of a VCM controlled in a voltage mode where also the electrical pole is taken into account. This model can be considered a valid approximation only in a limited frequency range, and when disturbances can be neglected with respect to the input and output signals. That is, when a track seek operation is being performed.

By assuming $K_t = K_{tnom}$, i.e., the effective torque constant of the motor coincides with its nominal value, the transfer function G(s) of the model of FIG. 4 is:

$$G(s) = \frac{Acc(s)}{V(s)} = \frac{K_t}{J \cdot R} \cdot \frac{R/L}{s + R/L}$$

wherein Acc(s) is the Laplace transform of the acceleration of the VCM, V(s) is the Laplace transform of the difference between the output of the power amplifier that drives the motor and the back electromotive force induced in the windings of the motor because of its rotation, J is the moment of inertia of the rotor, and L and R are the inductance and the resistance of the motor, respectively.

The transfer function G(s) is sampled by using a ZOH (Zero Order Holder) with a sampling period T, obtaining a respective discrete model of the motor:

$$G(z) = \frac{Acc(z)}{V(z)} = \frac{K_t}{J \cdot R} \cdot \frac{1 - \exp\left(-\frac{R}{L \cdot T}\right)}{z - \exp\left(-\frac{R}{L \cdot T}\right)} = -\frac{\theta_2}{z + \theta_1} \text{ wherein}$$

$$\theta_1 = -\exp\left(-\frac{R}{L \cdot T}\right); \theta_2 = \frac{K_t}{J \cdot R} \cdot \left(1 - \exp\left(-\frac{R}{L \cdot T}\right)\right).$$

Once the parameters $\theta_1$ and $\theta_2$ are calculated, it is possible to estimate the resistance R of the motor. These parameters are calculated by a classic RLS algorithm, as illustrated in Astrom et al. Adaptive Control, Addison Wesley, 1988. The steps include determining preliminarily the initial values of a parameter vector $$\Theta[k] = \begin{bmatrix} \theta_1[k] \\ \theta_2[k] \end{bmatrix}$$

and of an observation vector $$\Psi[k] = \begin{bmatrix} -Acc[k-1] \\ V[k-1] \end{bmatrix};$$

choosing the value of a weight $\gamma$ to be used for calculating the weighted sums of the RLS algorithm; and defining the initial value of an auxiliary parameter P as the inverse of the square norm of the initial observation vector.

The steps further include iteratively performing the following operations: calculating a correction vector L[k+1] according to the following formula:

$$L[k+1] = \frac{P[k]}{\gamma} \cdot \Psi[k+1] \cdot \left(\frac{1}{1-\gamma} + \Psi^t[k+1] \cdot \frac{P[k]}{\gamma} \cdot \Psi[k+1]\right)^{-1}$$

wherein $\Psi^t[k+1]=[-Acc[k]\ V[k]]$; generating a new observation vector $\Psi[k+2]$; calculating a prediction error e[k+1] as a function of the parameters vector and the observation vector, preferably according to the following formula:

$$e[k+1]=Acc[k+1]-(\theta_2[k+1]\cdot V[k]-\theta_1[k+1]\cdot Acc[k]);$$

calculating a new parameters vector $\Theta[k+1]$ according to the following formula:

$$\Theta[k+1]=\Theta[k]+L[k+1]\cdot e(k+1);\text{ and}$$

calculating a new value of the auxiliary parameter P[k+1] as a function of the current correction vector, the current observation vector and the previous value of the auxiliary parameter P[k], preferably according to the following formula:

$$P[k+1] = \frac{1}{\gamma} \cdot (1 - \Psi^t[k+1]\cdot L[k+1]) \cdot P[k].$$

Values of the parameter $\gamma$ near to 1 make the algorithm converge relatively fast but with a relatively large variance. In contrast small values (near 0, 9) of this parameter make the algorithm converge relatively slowly but with a small variance. A good compromise includes having the parameter $\gamma$ range between 0.95 and 1. A preferred value of this parameter is 0.9995.

The above algorithm may be simplified for reducing the computational load of operations to be performed. This simplified version will be referred below as "identification with MIT rule" and is composed of the following steps: determining preliminarily the initial values of a parameter vector $$\Theta[k] = \begin{bmatrix} \theta_1[k] \\ \theta_2[k] \end{bmatrix}$$

and of an observation vector $$\Psi[k] = \begin{bmatrix} -Acc[k-1] \\ V[k-1] \end{bmatrix};$$

choosing the value of a weight $\lambda$ to be used for calculating the weighted sums of the MIT algorithm; estimating the acceleration of the motor $\hat{Acc}[1]$ that will be detected at the next iteration step as a function of the initial values of the parameters vector and observation vector, preferably according to the following formula:

$$\hat{Acc}[k+1] = [\theta_1[k]\ \theta_2[k]] \cdot \begin{bmatrix} -Acc[k] \\ V[k] \end{bmatrix};$$

generating a new observation vector $\Psi[2]$; calculating a prediction error e[k] as a function of the estimated and effective acceleration of the motor, preferably according to the following formula:

$$e[1]=\hat{Acc}[1]-Acc[1].$$

The steps further include iteratively performing the following operations: estimating the acceleration of the motor $\hat{Acc}[k+1]$ that will be detected at the next iteration step as a function of the present parameters vector and observation vector, preferably according to the following formula:

$$\hat{Acc}[k+1] = [\theta_1[k]\ \theta_2[k]] \cdot \begin{bmatrix} -Acc[k] \\ V[k] \end{bmatrix};$$

calculating a new parameters vector $\Theta[k+1]$ by correcting the previous parameters vector $\Theta[k]$ and the current observation vector $\Psi[k+1]$, preferably according to the following formula:

$$\Theta[k+1]=\Theta[k]-\lambda\cdot e(k)\cdot\Psi[k+1];$$

generating a new observation vector $\Psi[k+2]$; and calculating a prediction error e[k+1] as a function of the estimated and effective acceleration of the motor, preferably according to the following formula:

$$e[k+1]=\hat{Acc}[k+1]-Acc[k+1].$$

Figure 6:
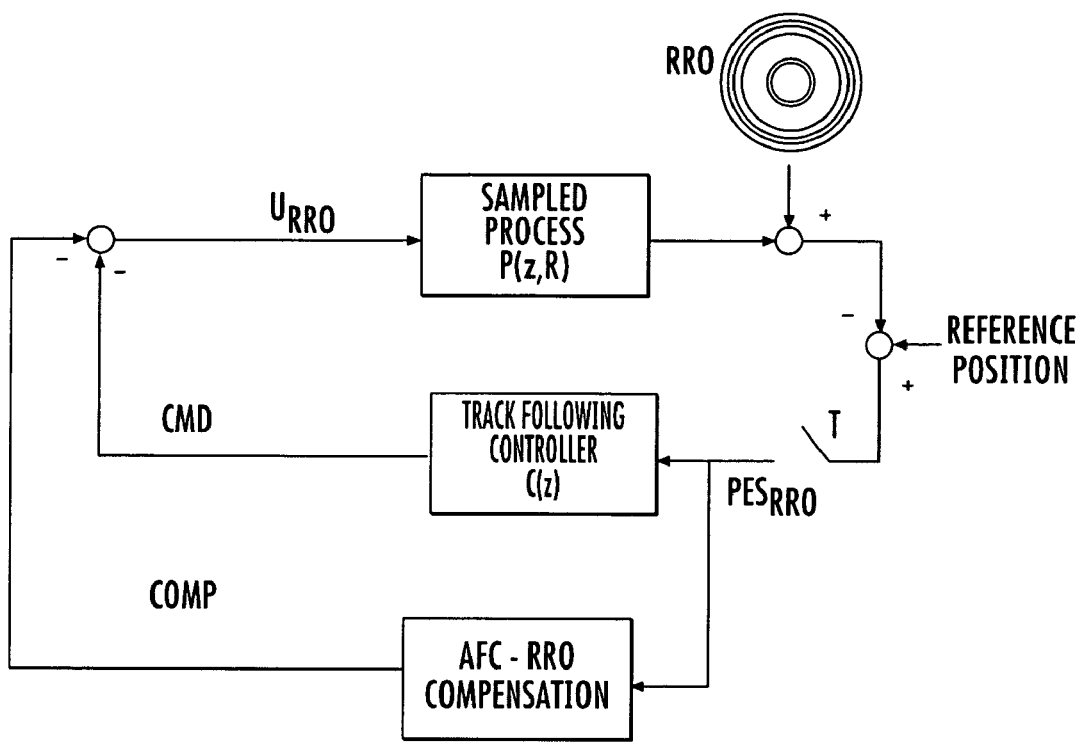
FIG. 6 is a block diagram of a basic scheme of the loop for controlling the position of the heads in which the influence of RRO disturbances is highlighted according to the invention.

Preferably, the value of the parameter $\lambda$ is $0.125 \cdot 10^{-10}$. FIG. 6 shows a graph of estimated values of the resistance R of the motor using the MIT rule connecting a 1 $\Omega$ resistor in series to the motor.

To keep the computational load as low as possible, it is possible to simplify the model of the VCM. In the low frequency range of the motor (i.e., neglecting the effects of its inductance L), the motor can be approximated by a purely inertial system controlled by the difference between the voltage output by the power amplifier and the back electromotive force induced in the windings of the motor because of the rotation of its rotor. By neglecting the effect of the inductance L, the model of the motor is described by the following constant transfer function:

$$G(s) = \frac{Acc[s]}{V[s]} = \frac{K_t}{J \cdot R} = G(z) = \theta.$$

In so doing the parameter vector has only one component $$\theta = \frac{K_t}{J \cdot R}.$$

The value of the gain $\theta$ can be calculated using an MIT rule identification algorithm, comprising the following steps: determining preliminarily the initial values of the gain $\theta$ and of the observation vector $$\Psi[k] = \begin{bmatrix} -Acc[k-1] \\ V[k-1] \end{bmatrix};$$

choosing the value of a weight $\lambda$ to be used for calculating the weighted sums of the algorithm; calculating an expected input signal of the motor $\hat{V}[1]$ as a function of the initial values of the parameters vector and observation vector, preferably according to the following formula:

$$\hat{V}[k] = \frac{Acc[k]}{\theta[k]};$$

calculating a prediction error e[k] as a function of the estimated and effective input voltage of the motor, preferably according to the following formula:

$$e[k] = \hat{V}[k] - V[k].$$

The steps further include iteratively performing the following operations: calculating a new gain $\theta[k+1]$ by incrementing or decrementing the previous parameters vector $\theta[k]$ and the current observation vector $\Psi[k+1]$, preferably according to the following formula:

$$\Theta[k+1] = \Theta[k] - \lambda \cdot e(k) \cdot Acc[k+1];$$

generating a new observation vector $\Psi[k+2]$; and calculating a prediction error e[k+1] as a function of the estimated and effective input voltage of the motor, preferably according to the following formula:

$$e[k+1] = \hat{V}[k+1] - V[k+1].$$

With this simple algorithm it is possible to evaluate the resistance R of the motor and use it for compensating eventual variations of the torque constant $K_t$.

To calculate the resistance R from the estimated gain $\theta$ it is more convenient to perform the estimation algorithm with a variable $\xi$ defined as follows:

$$\xi = C \cdot \frac{1}{\theta} = C \cdot \frac{J \cdot R}{K_t}$$

wherein C is a constant due to the measure of the input and output variables of the algorithm.

In so doing the algorithm outputs a value which is directly proportional to the effective resistance of the motor.

Figure 5:
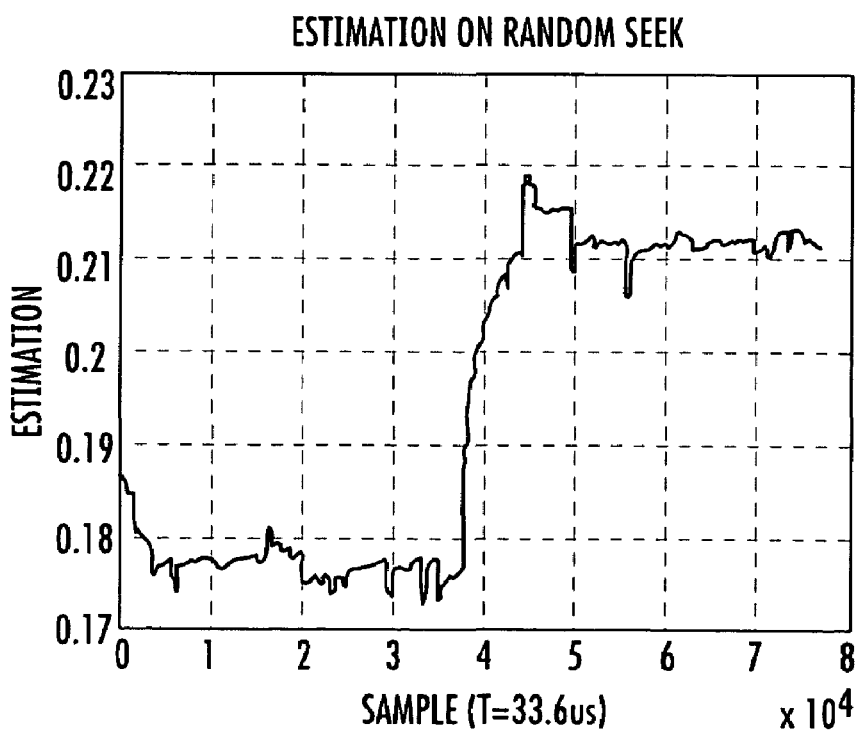
FIG. 5 is a graph of estimated values of the variable $\xi$ calculated with the MIT algorithm according to the invention.

FIG. 5 shows a graph of the output variable $\xi$ calculated with the above simplified MIT algorithm during a random seek operation upon increasing the motor resistance from 7 $\Omega$ to 8.4 $\Omega$ (+20%) by connecting in series to it a resistor of 1.4 $\Omega$. The output variable $\xi$ increases about 19%, confirming the reliability of the above algorithm.

As stated above, the torque constant $K_t$ of the motor has been considered constant and equal to its nominal value $K_{tnom}$. When this condition is no longer verified, the value of the difference between the voltage output by the power amplifier and the estimated back electromotive force of the motor may differ from the actual value. This may lead to a relevant imprecision in determining the actual value of the resistance of the motor.

If the effective torque constant $K_t$ differs from its nominal value $K_{tnom}$, the transfer function of the VCM includes a spurious zero at $$\frac{K_t \cdot (K_t - K_{tnom})}{J \cdot R}.$$

Therefore, at very low functioning frequencies the inertial model is no longer valid.

The position of this zero for a reasonable difference of 10% between the effective and nominal torque constant is around 8 rad/s, so its effect can be compensated by an appropriate filter. According to a preferred embodiment of the invention, the data used in the RLS algorithm are obtained by filtering the calculated data with a band pass filter with a bandwidth of 1–150 Hz. In so doing the undesired effects of the above mentioned spurious zero, as well as Repetitive Run Out disturbances, are filtered and do not affect the estimation of the resistance of the motor.

Parameters estimation during track following operations will now be discussed. The method for estimating the resistance of a motor described in the previous section works properly when disturbances (first harmonic of the RRO and NRRO) can be neglected, i.e., when the disk is performing relatively large seek operations. Prolonged seek operations cause self-heating of the VCM and R may vary by 20%.

During a track following, disturbances cannot be neglected so the estimation algorithm described in the previous section cannot be applied. According to the invention it is possible to exploit disturbances for estimating the resistance of the VCM.

Let us consider the servo-controller during a track following operation and suppose that the only disturbances acting on the main closed loop are RRO (Repetitive Run Out) disturbances, as schematically illustrated in FIG. 6. The signal $U_{RRO}$ provided to the voltage mode controller FILTER is:

$$U_{RRO} = \frac{RRO}{1 + C(z) \cdot P(z, R)}$$

wherein P(z, R) is the transfer function of the blocks (FILTER and VCM) on the signal path of the main control loop and C(z) is the transfer function of the heads position controller.

Considering a low frequency disturbance, the position controller has a large gain and the cascade of blocks on the signal path is essentially inertial. It results that the ratio between the signals $U_{RRO}$ for a VCM with resistance $R_1$ and $R_2$, at two different temperatures $T_1$ and $T_2$, respectively, under the same disturbance, is equal to:

$$\frac{U_{RRO}|_{@R=R_1}}{U_{RRO}|_{@R=R_2}} = \frac{[1 + C(z) \cdot P(z, R)]_{@R=R_2}}{[1 + C(z) \cdot P(z, R)]_{@R=R_1}} \approx \frac{R_1}{R_2}$$

In other words, if the disturbance is constant at a certain frequency, the value of the compensating command varies with the VCM resistance. This gives an alternative method to estimate the variation of R, to be used during a track following, provided that its initial value has been determined with the estimation procedure described previously to be performed during a seek operation.

Figure 7:
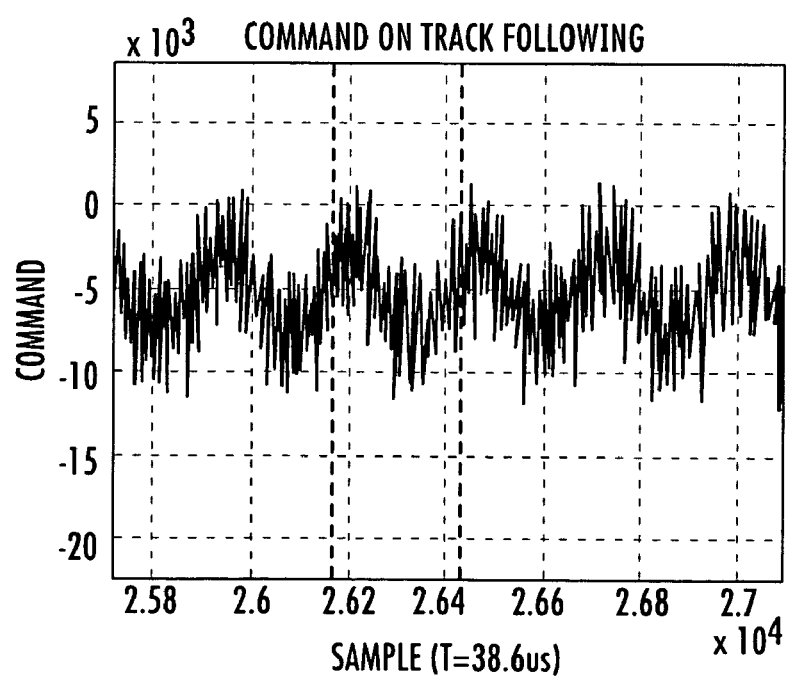
FIG. 7 is a sample graph of RRO disturbances according to the invention.

Moreover, with fluid-dynamic bearings NRRO is very small and, in turn, RRO is quite stable, so one of its harmonics can be used for the identification during track following. A sample graph of an RRO disturbance is shown in FIG. 7. Usually, the first harmonic of the RRO is larger than the others, so the highest signal-to-noise ratio can be expected by evaluating the command at such a frequency.

Figure 8:
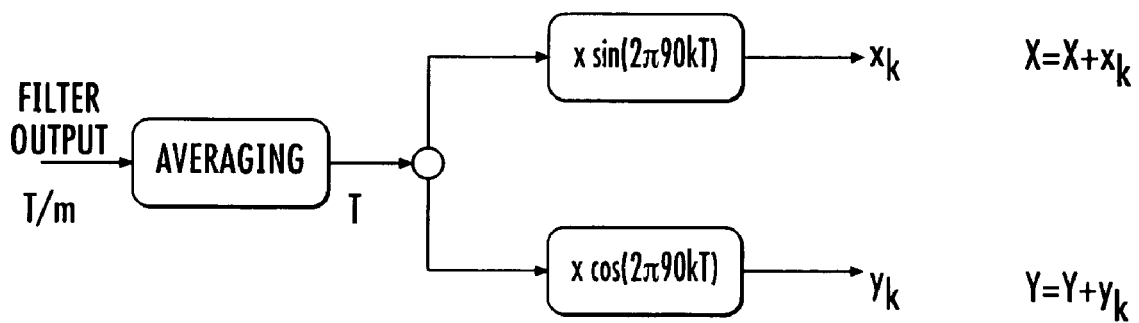
FIG. 8 is a block diagram illustrating how to calculate the amplitude of the 90 Hz component of the RRO disturbances according to the invention.

Let us consider a disk rotating at 5400 RPM, corresponding to a 90 Hz RRO fundamental. The straightforward way to get the amplitude of the 90 Hz component in the command includes computing the corresponding FFT as shown in FIG. 8, where k is the current single rate sample and T is the single rate sampling period.

The command generated by the voltage mode motor controller is multi-rate with ratio m, then its value is averaged over one single rate sample, before being multiplied by the samples of $\sin(2\pi 90kT)$ and $\cos(2\pi 90kT)$, stored into a look-up table. The outputs $x_k$ and $y_k$ at each sample are then cumulated over one disk rotation into the variables X and Y, and then processed as follows at the end of the rotation:

$$\begin{cases} |\mathit{fft}\ 90(i)|^2 = Y^2 + X^2 \\ X = 0;\ Y = 0 \\ \mathit{Tfid}(i) = \mathit{Tfid}(i-1) + \alpha[|\mathit{fft}\ 90(i)|^2 - \mathit{Tfid}(i-1)] \end{cases}$$

Note that the squared absolute value of the FFT bin is low-pass filtered to smooth out the estimated value. Given a seek command at the i-th disk rotation after the last seek command, the pre-filter gain can be adapted to the new value of VCM resistance simply multiplying it by:

$$\sqrt{\frac{\mathit{Tfid}(i-1)}{\mathit{Tfid}(0)}}$$

where Tfid(0) represents the initial value of the squared absolute value of the 90 Hz component, computed when the settling phase is over.

Figure 9:
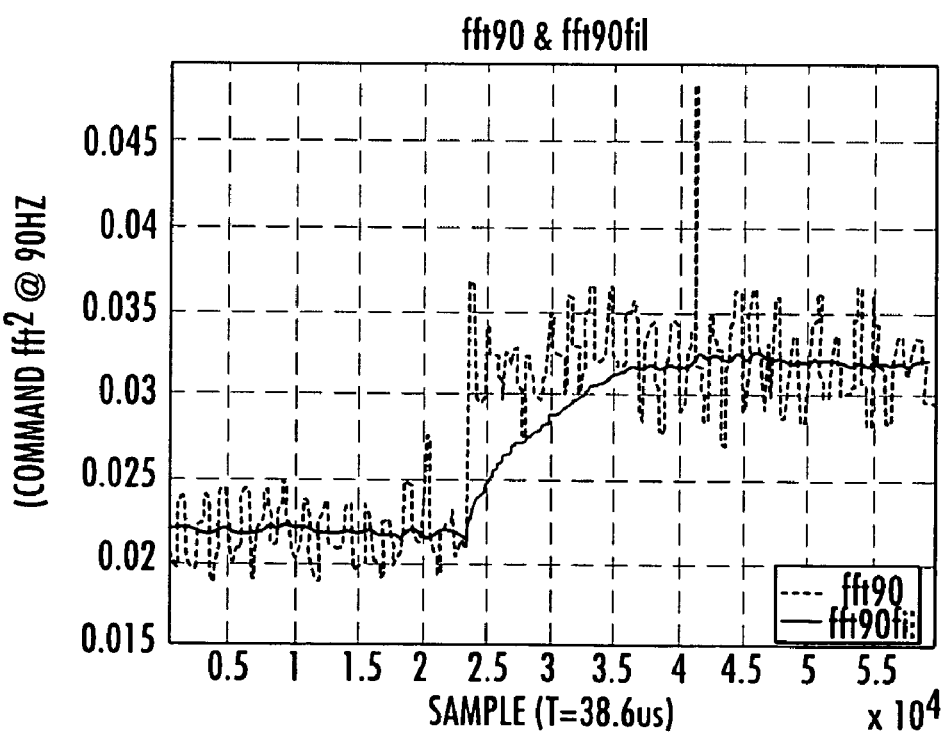
FIG. 9 is a graph showing the averaged amplitude of the component at 90 Hz of the compensating command output by the heads position controller upon a 20% variation of the resistance of the motor according to the invention.

As a result, FIG. 9 shows that the averaged amplitude of the 90 Hz fundamental of the compensating signal $U_{RRO}$ varies by 19% when increasing the coil resistance by 1.4 Ω, as obtained with the previous method.

According to the preferred embodiment of the invention, the resistance R of the motor is estimated during a track following operation in a very fast way by exploiting certain circuit blocks that are present in the controller for positioning the heads onto the hard disk.

Figure 1:
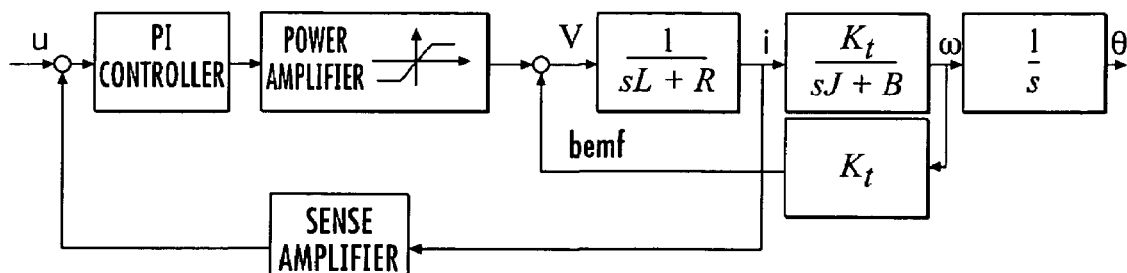
FIG. 1 is a block diagram of Current Minor Loop for driving in a current mode a VCM in conjunction with other blocks of the DC motor according to the prior art.
Figure 2:
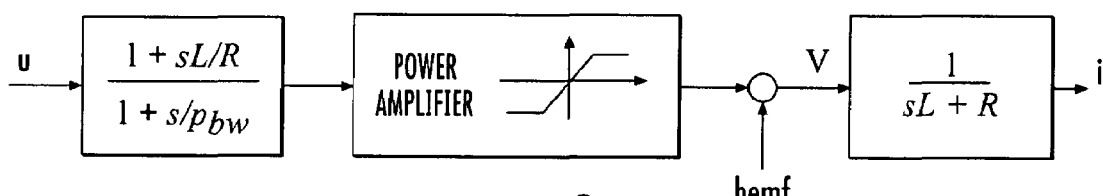
FIG. 2 is a block diagram of an open loop voltage mode control of a VCM according to the prior art.
Figure 3:
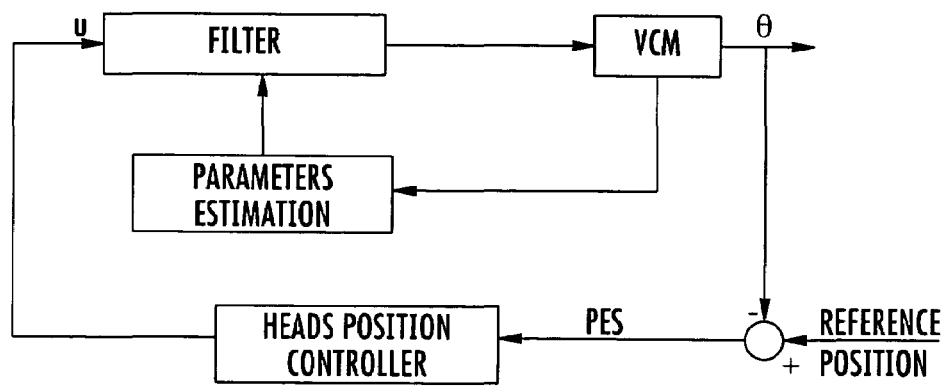
FIG. 3 is a block diagram of a loop for controlling the position of the rotor of a DC motor driven in a voltage mode according to the prior art.

Let us refer to FIG. 6, which basically illustrates the control loop of the position of the heads depicted in greater detail in FIG. 3. The controller for positioning the heads is generally composed of two blocks to eliminate as much as possible the effect of RRO disturbances during track following.

The first block TRACK FOLLOWING CONTROLLER performs a closed control loop of the head's position to provide system stability and the rejection of all non-repetitive disturbances (shock, windage, bias, etc.). The second block AFC-RRO COMPENSATION is a block that performs a feed-forward action by summing its own output to the output of the block TRACK FOLLOWING CONTROLLER.

The main task of this second block is to eliminate as much as possible all RRO disturbances from the Position Error Signal (PES). This is referred to in the above cited references as an Adaptive Feed-forward Compensation (AFC).

Figure 10:
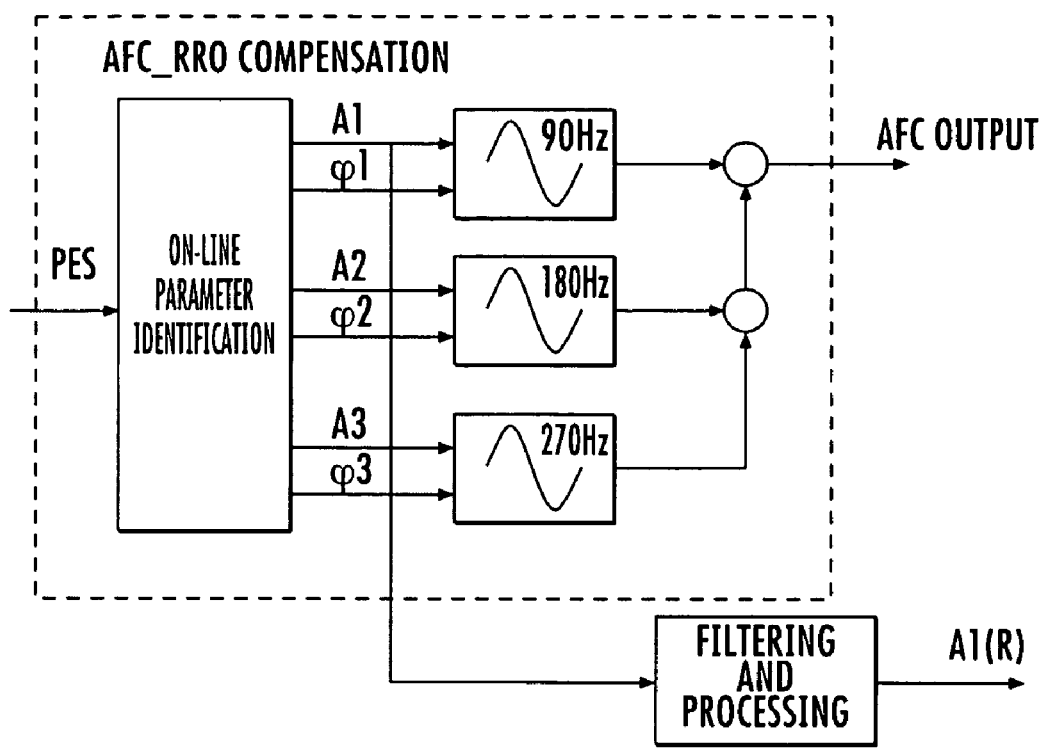
FIG. 10 is a block diagram illustrating the internal blocks that compose the Adaptive Feed-forward Compensation block depicted in FIG. 6.

As shown in FIG. 10, the AFC block, which is bordered by the dashed line, is basically formed by a plurality of sinusoidal generators whose amplitude A and phase φ varies. The sine signals generated by the AFC are input to the process P(z, R) to cancel certain harmonics of the signal PES. Usually the frequency of these harmonics is close to the rotating spindle mechanical frequency.

Each amplitude and phase of the signal coming from these sine generators is set by an estimating procedure that, by observing all harmonics present in power spectrum of the Position Error Signal (PES), is capable of finding the amplitude and phase of the harmonic that each sine generator should input to the process P for canceling those harmonics in the PES signal.

According to the invention, it is possible to exploit the sine generators of the AFC block to estimate the resistance of the VCM. When the VCM has completed a seek and it is just entered in the track following mode, the amplitude A1 of the sine generator whose frequency is equal to rotating spindle mechanical frequency (set to 90 Hz in the preferred embodiment) is read from a register of the AFC block.

The amplitude A1 is averaged on N spindle turns and then its mean value $A1_{mean}$ is stored as a reference value $A1_{init}$. When a new value A1 is read, the averaged value $A1_{mean}$ is updated and this mean value $A1_{mean}$ is fed to a low pass filter to reduce high frequency noise. The amplitude A1(k) of the sine signal to be generated is the filtered version of the mean value $A1_{mean}$.

If VCM resistance R increases, the compensating command COMP for compensating RRO effects increases proportionally. With the initial value $R_{init}$ of the VCM resistance being known, and evaluated during a previous seek operation, according to the invention an estimated value of the VCM resistance is:

$$R(k) = R_{init} \cdot \frac{A1(k)}{A1_{init}}.$$

Figure 11:
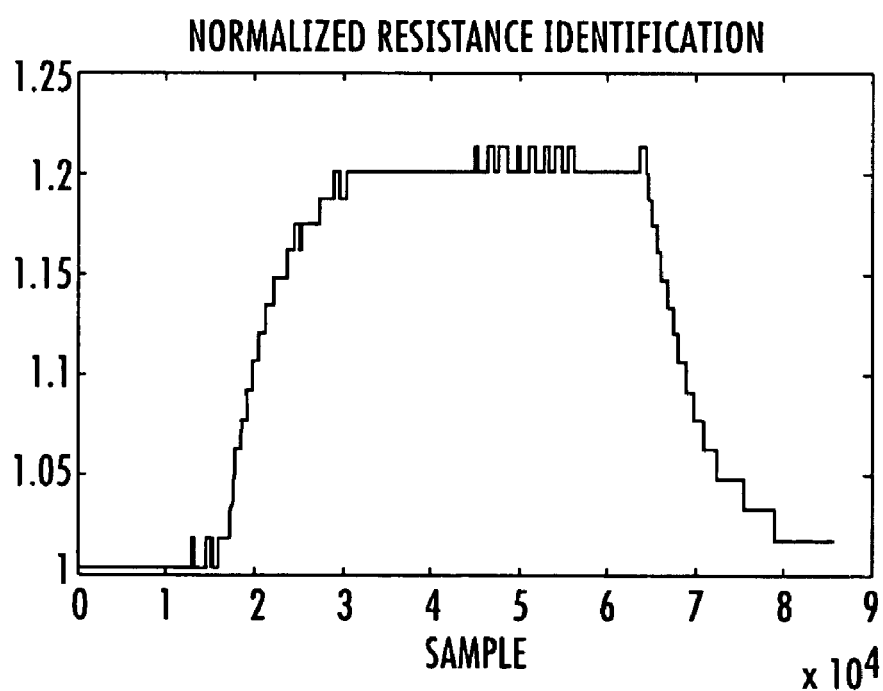
FIG. 11 is a graph depicting the averaged amplitude of the component at 90 Hz of the compensating command obtained from the registers of the AFC block of FIG. 10 upon a 20% variation of the resistance of the motor.

FIG. 11 shows that the filtered averaged amplitude A1(k) of the 90 Hz harmonic of the compensating command generated by the heads position controller, calculated with this method using the block AFC, varies by 19% when increasing the coil resistance by 1.4 Ω. This result is identical to that obtained with the first method for estimating the resistance of a motor during a track following operation.

Switching between seek and track following resistance estimation methods will now be discussed. According to another aspect of the invention, it is possible to switch from the resistance estimation method during a seek operation to the resistance estimation methods during a track following operation, and vice-versa. In so doing it is possible to estimate the resistance of a VCM in almost any operating condition by performing a transition from one of the previously described methods to another.

A very straightforward way of doing this includes activating a seek identification procedure when the absolute values of the signal PES and velocity go over pre-established thresholds, and using the track following identification procedure when the signal PES and velocity are smaller than the same thresholds.

For example, FIG. 15 illustrates the case in which the identification algorithm during seek modes is activated when the position error (the difference between target position and the actual position) is larger than a first threshold. In the shown example this is 10 h tracks and is deactivated when the difference is smaller than a second threshold, which in the shown example is 2 h.

Similarly, the identification algorithm during the track following modes is activated when the position error is smaller than a third threshold, that in the shown example is 2 h and the speed is lower than a fourth pre-established threshold value, and is deactivated when this difference is larger than a fifth threshold, which in the shown example is 10 h.

Of course, all these thresholds may be varied depending on the HDD used and the chosen control strategy. As an alternative, it is possible to exploit the internal flags of the HDD that signal that the disk is in a seek or track following mode for switching from an identification algorithm to the other. This alternative can be implemented only if such information can be accessed.

Figure 12:
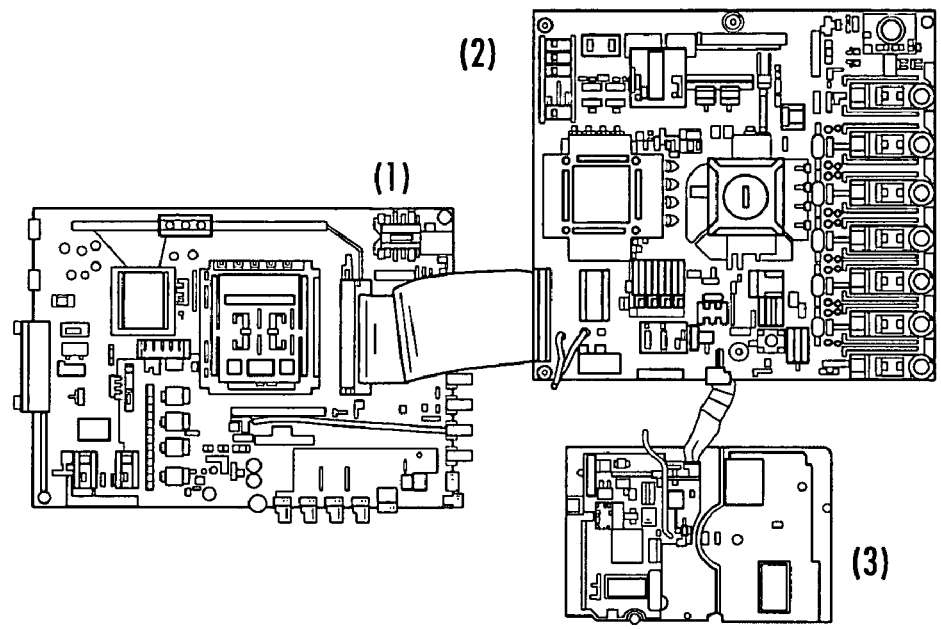
FIG. 12 is a picture illustrating the experimental system used for testing the methods of the invention.

A test system will now be discussed. The experimental results presented in the previous sections were obtained by using the test system of FIG. 12, composed of a DSP board (1), an interface board (2) and the HDD (3). The DSP board mounts an Emerald processor, of STMicroelectronics, with a 20 bit data width and 50 MHz clock. The VCM of the hard disk (3) has been controlled with the DSP board (1) implementing the Voice Coil Model-based Control (VCMC) disclosed in the above cited references.

Using the VCMC, parameter estimation and adaptation of the controller in a voltage mode of the motor running on the DSP and all computations are executed in a few µs. The number and type of instructions to be executed by the DSP are reported in TABLE 1 using the MIT rule and considering a constant transfer function of the motor, specifying whether they are repeated in single rate or multi rate.

TABLE 1

| Every Single Rate Sample | | |
|---|---|---|
| Operation | Sum | Mul |
| Acceleration | 1 | 0 |
| BEMF Compensation | 1 | 1 |
| LP Filter | 4 × 2 | 3 × 2 |
| HP Filter | 2 × 2 | 1 × 2 |
| Depending on operating mode: | | |
| Seek Id | 2 | 3 |
| TrackFollowing Id | 2 | 3 |
| Total | 16 | 12 |
| Every Multi Rate Sample | | |
| Operation | Sum | Mul |
| Prefilter with adaption | 5 | 10 |
| After the first disc rotation in TF operating mode | | |
| Operation | | Div |
| 1/Tfid (0) | | 1 |
| Every Disc Rotation in TF operating mode | | |
| Operation | Sum | Mul |
| Track Following Id | 3 | 5 |

Compared to the EKF algorithm reported in the Oboe et al. references, the number of instructions per cycle required by the proposed algorithm is less than one tenth, with a drastic reduction of the computational requirements. The interface board mounts a PWM driver for the VCM and a few FPGAs (Field Programmable Gate-Arrays) for handling the data exchange between the disk and the DSP. The PWM driver has a switching frequency at 12 times the servo frequency (i.e., around 320 kHz) and 14 bits resolution. Finally, the disk is a standard low-end product, with 5400 RPM, 93 kTPI and the sampling period of the servo-controller is 38.5 µs.

With the system described above, several experiments have been performed, aimed at showing the effectiveness of the on-line adaptation and the derived benefits by using both track following and seek estimation algorithms. In all experiments, VCM resistance variation is simulated by adding a 1.4 Ω resistor in series to the VCM by using a switch. This results in a step-wise variation, even if the expected variation has a time constant around tens of seconds.

Figure 13:
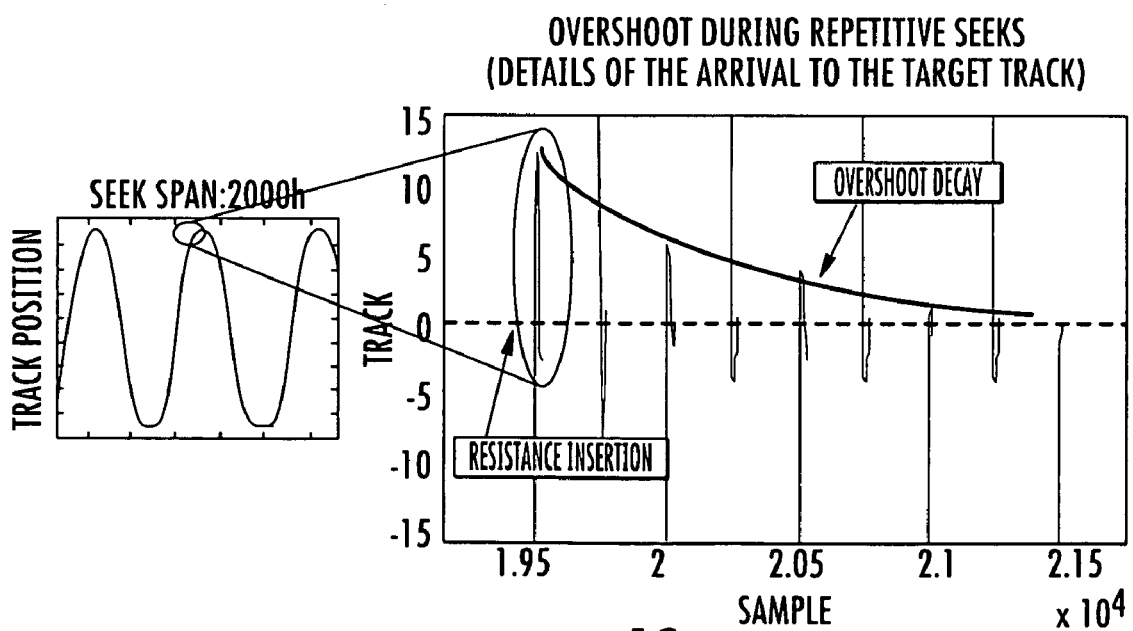
FIG. 13 is a graph showing the trajectory of the heads during a track seek operation with magnified details at the arrival on a certain track according to the invention.

The first experimental result is obtained by performing only estimations during seek operations. The disk performs repetitive seeks of 2000 h tracks span. During a seek operation, the resistance is increased, resulting in an increased overshoot of the response. FIG. 13 illustrates the arrivals at a target track, showing that the overshoot is decreasing as the adaptation goes on. As a result, after a certain number of seek operations, the VCMC controller is re-tuned on the actual values of the parameters of the VCM and the nominal performances of a servo-controller are achieved.

The second type of experiments is aimed at showing the need for the track following identification. In fact, should the resistance of the motor vary during the track following without performing any adaptation of the controller in voltage mode, the first seek response may show unexpected overshoot, with an increment of the access time. Of course, the controller in a voltage mode could be adapted by using the estimation procedure applicable during seek operations, but it takes a while to converge to the new values.

Identification during track following, then, is the only way to insure that nominal seek performance is maintained in spite of variations of VCM resistance that occurs when the disk is cooling down during long track following operations.

FIGS. 14a, 14b and 14c summarize all the above considerations. The three plots show the arrival at the target track for the first seek after a track following, during which the VCM resistance has been varied by 19%. FIG. 14a shows the performance of the VCMC without adaptation, while the FIG. 14b shows the arrival at the target track when only the seek-based identification is turned on. A little improvement in the overshoot is achieved, since the estimation algorithm starts to update the estimated plant gain as soon as the seek operation starts. Finally, FIG. 14c shows the arrival at the target track when parameters estimation is performed during seek and track-following operations and the VCMC controller is continuously adapted. As a result, only with both identification algorithms running, the perfect arrival is achieved, in spite of the large variation of VCM resistance occurred.

It is worth noting that the use of seek-based or track following-based identification is determined by the state of the disk. Of course, HDD internal flags signal if the disk is performing a seek, settling or track following operation, but such an information was not available in the system under test. Thus, a seek estimation procedure has been simply activated when the absolute values of PES and speed surpassed certain thresholds.

Similarly, a track following estimation procedure controller PES and speed were smaller than the same thresholds. Table 2 compares the results obtained using an internal current controller with those obtained with the fully tuned VCMC and with the VCMC not re-tuned after a 19% variation of the VCM resistance. The results confirm that the tuned VCMC has a performance that closely matches that of the standard current driver. The small increment in error is essentially due to NRRO (Non Repetitive Run Out) disturbances, probably related to the use of a PWM driver. Moreover, it is confirmed that track-following performance is not significantly affected by a variation of the VCM resistance.

TABLE 2

|  | Current mode | VCMC - tuned | VCMC - untuned |
| --- | --- | --- | --- |
| 3 sigma | 0.0719 | 0.0766 | 0.0803 |
| 3 sigma NRRO | 0.0692 | 0.0743 | 0.0786 |

What is claimed is:

1. A method for estimating resistance of a DC motor for positioning read/write heads of a data storage disk, the DC motor being controlled in an open-loop voltage mode through a motor controller input with a first signal to compensate positioning of the read/write heads onto the data storage disk, the method comprising:
generating the first signal based upon a position error signal representing a difference between a position of the read/write heads and a center of a track to be read;
monitoring the first signal during a read operation of data being stored on the data storage disk; and
estimating the resistance based upon spectral components of the first signal.

2. A method according to claim 1, wherein the spectral components of the first signal comprise an amplitude of at least one harmonic thereof.

3. A method according to claim 2, wherein variations of the resistance from a nominal value are estimated by assuming the variations to be proportional to variations of the amplitude of a first harmonic of the first signal.

4. A method according to claim 1, wherein the spectral components of the first signal comprise a power spectral density thereof.

5. A method according to claim 1, further comprising extracting a harmonic component of the first signal due to repetitive run out disturbances; and wherein the spectral components of the first signal comprise the extracted harmonic component.

6. A method according to claim 5, further comprising providing an adaptive feed-forward compensation circuit receiving as input the position error signal for generating AC components of a compensating signal for canceling harmonic components of the position error signal; and wherein the spectral components of the first signal further comprise at least one parameter of the AC components of the compensating signal.

7. A method according to claim 6, further comprising:
determining a reference value of the resistance of the DC motor and an initial value of an amplitude of a harmonic of the AC components of the compensating signal; and
during a track following operation, iteratively performing the following
sampling a value of the amplitude of the harmonic of the AC components of the compensating signal,
calculating a mean amplitude of the harmonic based upon a current amplitude and at least a previously determined value of the amplitude,
low pass filtering the mean amplitude, and generating a filtered value of the amplitude, and
determining an actual value of the resistance of the DC motor by multiplying the reference value of the resistance by a ratio between the filtered value of the amplitude and the initial value thereof.

8. A method for estimating resistance of a DC motor comprising:
defining a model of the DC motor, and receiving an input signal based upon a difference between a driving voltage of the DC motor and an estimated back electromotive force induced in windings of the DC motor;
generating an observation vector by periodically sampling an acceleration and the input signal of the DC motor;
defining a prediction error based upon the observation vector and an output vector having components based upon parameters of the DC motor;
executing an identification algorithm for generating the output vector that reduces the prediction error; and
estimating the resistance of the DC motor based upon the components of the output vector.

9. A method according to claim 8, further comprising:
estimating the back electromotive force by multiplying a detected speed of the DC motor by a nominal torque constant of the DC motor; and
band-pass filtering components of the observation vector before using them in the identification algorithm, and cut-off frequencies of the band-pass filtering being determined for compensating differences between the nominal torque constant and an effective torque constant of the DC motor.

10. A method according to claim 9, wherein a bandwidth of the band-pass filtering is between 1 Hz and 150 Hz.

11. A method according to claim 8, wherein the model of the DC motor comprises a zero order purely inertial model.

12. A method according to claim 8, wherein the identification algorithm comprises a recursive least square (RLS) identification algorithm.

13. A method according to claim 8, wherein the identification algorithm comprises an MIT rule identification algorithm.

14. A method for estimating resistance of a DC motor for positioning read/write heads of a data storage disk, the DC motor being controlled in an open-loop voltage mode through a motor controller input with a first signal to compensate positioning of the read/write heads onto the data storage disk, the method comprising:
performing the following when an absolute value of a difference between a desired target position and an effective position of the read/write heads becomes larger than a first threshold, and stopping the following when the difference becomes smaller than a second threshold
generating the first signal based upon a position error signal representing a difference between a position of the read/write heads and a center of a track to be read,
monitoring the first signal during a read operation of data being stored on the data storage disk, and
estimating the resistance based upon spectral components of the first signal; and
performing the following when the absolute value of the difference between the desired target position and the effective position of the read/write heads becomes smaller than a third threshold and a velocity of the read/write heads becomes smaller than a fourth threshold, and stopping the following when the difference becomes larger than a fifth threshold
defining a model of the DC motor, and receiving an input signal based upon a difference between a driving voltage of the DC motor and an estimated back electromotive force induced in windings of the DC motor,
generating an observation vector by periodically sampling an acceleration and the input signal of the DC motor,
defining a prediction error based upon the observation vector and an output vector having components based upon parameters of the DC motor,
executing an identification algorithm for generating the output vector that reduces the prediction error, and
estimating the resistance of the DC motor based upon the components of the output vector.

15. A method according to claim 14, wherein the first and fifth thresholds are equal to each other, and the second and third thresholds are equal to each other.

16. A method according to claim 14, with respect to the steps associated with the first and second thresholds, the spectral components of the first signal comprise an amplitude of at least one harmonic thereof.

17. A method according to claim 16, wherein variations of the resistance from a nominal value are estimated by assuming the variations to be proportional to variations of the amplitude of a first harmonic of the first signal.

18. A method according to claim 14, with respect to the steps associated with the first and second thresholds, the spectral components of the first signal comprise a power spectral density thereof.

19. A method according to claim 14, with respect to the steps associated with the first and second thresholds, further comprising extracting a harmonic component of the first signal due to repetitive run out disturbances; and wherein the spectral components of the first signal comprise the extracted harmonic component.

20. A method according to claim 19, with respect to the steps associated with the first and second thresholds, further comprising providing an adaptive feed-forward compensation circuit receiving as input the position error signal for generating AC components of a compensating signal for canceling harmonic components of the position error signal; and wherein the spectral components of the first signal further comprise at least one parameter of the AC components of the compensating signal.

21. A method according to claim 20, with respect to the steps associated with the first and second thresholds, further comprising:
determining a reference value of the resistance of the DC motor and an initial value of an amplitude of a harmonic of the AC components of the compensating signal; and
during a track following operation, iteratively performing the following
sampling a value of the amplitude of the harmonic of the AC components of the compensating signal,
calculating a mean amplitude of the harmonic based upon a current amplitude and at least a previously determined value of the amplitude,
low pass filtering the mean amplitude, and generating a filtered value of the amplitude, and
determining an actual value of the resistance of the DC motor by multiplying the reference value of the resistance by a ratio between the filtered value of the amplitude and the initial value thereof.

22. A method according to claim 14, further comprising the following with respect to the steps associated with the third, fourth and fifth thresholds:
estimating the back electromotive force by multiplying a detected speed of the DC motor by a nominal torque constant of the DC motor; and
band-pass filtering components of the observation vector before using them in the identification algorithm, and cut-off frequencies of the band-pass filtering being determined for compensating differences between the nominal torque constant and an effective torque constant of the DC motor.

23. A method according to claim 22, with respect to the steps associated with the third, fourth and fifth thresholds, a bandwidth of the band-pass filtering is between 1 Hz and 150 Hz.

24. A method according to claim 14, with respect to the steps associated with the third, fourth and fifth thresholds, the model of the DC motor comprises a zero order purely inertial model.

25. A method according to claim 14, with respect to the steps associated with the third, fourth and fifth thresholds, the identification algorithm comprises a recursive least square (RLS) identification algorithm.

26. A method according to claim 14, with respect to the steps associated with the third, fourth and fifth thresholds, the identification algorithm comprises an MIT rule identification algorithm.

27. A motor controller for controlling a DC motor for positioning read/write heads of a data storage disk, the DC motor being controlled in an open-loop voltage mode, the motor controller comprising:

an input for receiving a first signal to compensate positioning of the read/write heads onto the data storage disk, the first signal being generated based upon a position error signal representing a difference between a position of the read/write heads and a center of a track to be read;

an adaptive feed-forward compensation circuit for canceling AC components of the position error signal, said adaptive feed-forward compensation circuit comprising an array of oscillators each generating an output harmonic based upon a respective pair of signals representing a frequency and a phase of a desired output harmonic, and a computation unit being input with the position error signal, and outputting the respective pairs of signals representing the frequency and the phase; and a resistance estimation circuit generating the signal representing the resistance based upon at least one signal of the pairs of signals representing the amplitude of a certain harmonic.

28. A motor controller according to claim 27, wherein frequency of the certain harmonic is a frequency of rotation of the data storage disk.

29. A motor controller according to claim 27, wherein the signal representing the resistance of the DC motor is proportional to the amplitude of the certain harmonic.

* * * * *